United States Patent [19]
Jamieson et al.

[11] Patent Number: 4,966,705
[45] Date of Patent: Oct. 30, 1990

[54] WASTE WATER TREATMENT PLANT AND PROCESS

[75] Inventors: Donald F. Jamieson, Clontarf, Australia; Paul J. Cardinal, San Francisco, Calif.

[73] Assignee: Austgen Biojet Holdings Pty. Ltd.

[21] Appl. No.: 326,278

[22] Filed: Mar. 21, 1989

Related U.S. Application Data

[63] Continuation of Ser. No. 68,747, Mar. 30, 1987, abandoned, which is a continuation of Ser. No. 767,756, Aug. 21, 1985, abandoned.

[30] Foreign Application Priority Data

Aug. 24, 1984 [AU] Australia .............................. PG6750
Aug. 24, 1984 [AU] Australia .............................. PG6751

[51] Int. Cl.$^5$ .............................................. C02F 3/30
[52] U.S. Cl. ................................. 210/605; 210/623; 210/104; 210/138; 210/195.3; 210/201; 210/220
[58] Field of Search ................. 210/614, 744, 96.1, 210/104, 87, 88, 89, 124, 220, 138, 139, 140, 195.3, 197, 199, 200, 201, 202, 605, 623, 630

[56] References Cited

U.S. PATENT DOCUMENTS

| | | | |
|---|---|---|---|
| 3,355,019 | 11/1967 | Mitchell | 210/104 |
| 3,400,822 | 9/1968 | McKeown | 210/195.3 |
| 3,419,146 | 12/1968 | Kovlovatos | 210/195.3 |
| 3,487,937 | 1/1970 | Kovlovatos | 210/199 |
| 3,563,382 | 2/1971 | Regent | 210/104 |
| 3,598,236 | 8/1971 | Nordlander et al. | 210/104 |
| 3,721,344 | 3/1973 | Rost | 210/104 |
| 3,834,536 | 9/1974 | Kelsey | 210/104 |
| 3,883,424 | 5/1975 | Stamblesky et al. | 210/195.3 |

*Primary Examiner*—Peter Hruskoci
*Assistant Examiner*—Christopher Upton
*Attorney, Agent, or Firm*—Burns, Doane, Swecker & Mathis

[57] ABSTRACT

A waste water treatment plant of simple design and high efficiency which is particularly adapted for use in small communities is described. The plant comprises a reaction tank and an aeration tank, inlet means to admit raw waste water continuously into the reaction tank, a first airlift pump or a penstock to transfer waste water intermittently from the reaction tank to the aeration tank to displace treated waste water therefrom through an outlet, aerators to aerate the aeration tank when the first airlift pump or penstock is inoperative, a second pump for transferring sludge and waste water from the aeration tank to the reaction tank after the first airlift pump has ceased operation and before the aerator is actuated, and control means to stop the aeration in sufficient time before actuation of the first airlift pump or penstock to allow substantial settling of the sludge in the aeration tank.

21 Claims, 5 Drawing Sheets

WASTE WATER TREATMENT PLANT AND PROCESS

This is a continuation of co-pending application Ser. No. 07/068,747 filed on Aug. 30, 1987 now abandoned, which is a continuation of Ser. No. 767,756 filed on Aug. 21, 1985, now abandoned.

BACKGROUND OF THE INVENTION

1. Field of the Invention

The present invention relates to a plant and a process for the aerobic treatment of waste water for the purpose of digesting the organic content thereof and thus reducing its biological oxygen demand (BOD).

2. Description of the Related Art.

Aerobic digestion of waste water, including sewerage, has been used for many years. The process is however expensive and a number of efforts, such as those disclosed in U.S. Pat. No. 4,468,327, have been made to improve on the original "trickle stone" filters first used for this purpose. The present invention is designed to provide a simple, relatively cheap and energy efficient waste water treatment plant and process which will still achieve high levels of BOD reduction. The plant and process according to the present invention are particularly adapted, due to their simplicity and efficiency, for use in small communities where the cost of prior art waste water treatment plants would not have been justified.

It should be noted that many of the prior art plants for the aerobic digestion of waste water include a movable decanter mechanism to decant treated waste water from the plant. Such decanters are expensive and often troublesome involving as they do moving parts. Such movable decanters have been considered necessary for two reasons. Firstly, waste water flows continuously into the plant and the level in the plant varies for this reason. Secondly, upon aeration of the plant the water level rises. The present invention proposes a plant having a fixed outlet which thus avoids the known problems of plants including decanter mechanisms while also avoiding the problems which gave rise to the original use of decanter mechanisms.

SUMMARY OF THE INVENTION

The present invention consists in a waste water treatment plant comprising a reaction tank and an aeration tank, inlet means for admitting waste water for treatment into the reaction tank, first transfer means for intermittently transferring waste water from the reaction tank to the aeration tank to displace treated waste water therefrom through stationary outlet means, aeration means to aerate the aeration tank when the first transfer means is inoperative, second transfer means for transferring sludge and waste water from the aeration tank to the reaction tank after the first transfer means has ceased operation and before the aeration means is actuated and control means to stop the aeration means in sufficient time before actuation of the first transfer means to allow substantial settling of the sludge in the aeration tank.

The present invention further consists in a process for the aerobic digestion of the organic content of waste water comprising cyclically following the steps of admitting the waste water to a reaction tank, intermittently transferring at least a part of the waste water from the reaction tank to an aeration tank to displace treated waste water therefrom, transferring some waste water and sludge from the aeration tank to the reaction tank after transfer of the waste water from the reaction tank to the aeration tank has ceased, aerating the aeration tank after the waste water and sludge have been transferred from the aeration tank to the reaction tank and stopping the aeration sufficiently before the next transfer of waste water from the reaction tank to the aeration tank to allow substantial settling of the sludge in the aeration tank.

The reaction tank and the aeration tank may be made of any suitable material and may be entirely separate tanks or may share a common wall. They may be of any desired shape. In one embodiment of the invention it is, however, preferred that the tanks are rectangular in plan and formed of steel sheet, one wall being common to both tanks. In an alternative embodiment the tanks may be separate and formed of concrete. It is desirable that the aeration tank be larger than the reaction tank, preferably the effective volume of the aeration tank is from 1.5 to 3 times the effective volume of the reaction tank. In a particularly preferred embodiment of the invention the aeration tank is twice the effective volume of the reaction tank.

It is preferred that the reaction tank be subdivided by a baffle into a pre-react zone and react zone. The pre-react zone preferably comprises from 10 to 40% of the effective volume of the reaction tank. The baffle preferably stops short of the floor of the reaction tank such that the two zones communicate through the aperture defined between the bottom of the baffle and the floor of the reaction tank. When the reaction tank is so subdivided it is preferred that the incoming, untreated, waste water, as well as the waste water and sludge being transferred from the aeration tank, are introduced into the pre-react zone of the reaction tank.

The presence of the reaction tank allows a pretreatment of the waste water prior to its entering the aeration tank. This pretreatment may be facilitated by the aeration of the reaction tank. If desired sludge may be recycled from the second container back into the first container as this will also facilitate pretreatment of the waste water and will thus allow higher F/M ratios and oxygen utilisation rates to be achieved. The presence of the first container will also produce a degree of averaging of the waste water transferred to the second containers as any short term flows of very high BOD loadings will be diluted by the immediately preceding and following flows. The "pre-reactor" nature of the first container allows the second container to be smaller than would be the case with conventional single vessel activated sludge reactors.

The aeration tank may also be subdivided into two zones by a baffle. The baffle can serve to prevent short circuiting of waste water through the aeration tank from the first transfer means to the outlet means. The baffle means also act to dissipate the flow velocity of the waste water being transferred from the reaction tank to the aeration tank such that sludge is not stirred up and carried out of the aeration tank as waste water is transferred into it through the first transfer means.

The first transfer means preferably comprises an air lift pump which draws waste water from the reaction tank, or the react zone thereof if the reaction tank is subdivided, and transfers it into the aeration tank. It is preferred that the air lift pump delivers the waste water into a launder above the aeration tank from where it can flow into the aeration tank under gravity. It is highly preferable that the waste water from the reaction tank is flowed from the launder into the bottom of the aeration tank through suitable distributor means. In one suitable embodiment of the invention the distribution means comprises a pipe or pipes extending along the length of the aeration tank and slightly above the floor thereof. The, or each, distribution pipe is preferably formed with outlet orifices at spaced intervals along its length.

In another embodiment of the present invention the first transfer means may comprise a pipe between the reaction tank and the aeration tank, the reaction tank being positioned at a higher level such that waste water can flow under gravity from the reaction tank to the aeration tank. Valve means are provided, in this embodiment of the invention, in the pipe between the two tanks so that the flow therebetween may be controlled.

The second transfer means preferably comprises an air lift pump which draws waste water and sludge from the lower half of the aeration tank and transfers it into the reaction tank, or the pre-react zone thereof if present. Alternatively any other form of pump, such as an impeller pump or a diaphragm pump could be used.

The aeration means preferably comprises at least one submerged aeration nozzle in the aeration tank. Preferably there are a plurality of such nozzles in the aeration tank however the number, size and placing of such nozzles is dependent upon the size of the tank and the BOD of the waste water. If desired alterntive aeration means may be used including waste water sprayers and the like. It is desirable that aeration means also be present in the reaction tank. If desired aerators in the reaction tank may be under common control with the aerators in the aeration tank however if desired they may be operated continuously.

The outlet means from the aeration tank preferably comprises a weir over which the clarified, i.e. treated, waste water can flow into a launder.

In operation the cycle of steps in the waste water treatment process is under the control of both level indicators and timing devices. The cycle may be considered to commence with the actuation of the first transfer means to transfer waste water from the reaction tank to the aeration tank. This is preferably under the control of a first, and uppermost, level switch in the reaction tank. This transference of waste water will continue until the water level in the reaction zone reaches a predetermined level and a second, and lowermost, level switch is activated. The transfer of waste water into the aeration zone will raise the level therein such that the settled waste water will rise above the outlet means and clarified effluent will flow out from the aeration tank.

When the first transfer means are stopped the waste water level in the aeration tank will be level with the outlet means. As aeration causes the liquid level in a tank to rise, if the aeration tank were now aerated, sludge and unclarified waste water would flow out through the outlet means. In order to prevent this, and in order to enhance initial digestion of the BOD of the waste water in the reaction tank, some of the waste water and sludge in the aeration tank is now transferred back to the reaction tank by the second transfer means. The second transfer means are preferably controlled by a timer set to operate some defined time after the first transfer means have stopped and to operate for a defined time sufficient that the water level in the aeration tank is reduced to a level such that aeration will not cause the aeration tank to overflow.

The aeration means are preferably timer actuated to commence aeration as soon as the second transfer means have stopped. The aeration will preferably continue until the waste water level in the reaction tank reaches a predetermined level and a third, intermediate level, switch is activated to stop the aeration. The aeration tank is then allowed to settle while the reaction tank continues to fill. When the water level in the reaction tank rises to the level of the first, uppermost, switch the cycle will recommence.

It is desirable for provision to be made for system malfunction and for this reason it is desirable to provide an overflow path from the reaction tank to the aeration tank. Similarly it is desirable that the outlet means from the aeration tank comprises a weir or the like which is unvalved. If the plant were rendered inoperative the waste water would run straight through the plant with minimal treatment but would at least discharge to drains.

Hereinafter given by way of example only is a preferred embodiment of the present invention described with reference to the accompanying drawings in which:

DESCRIPTION OF THE PREFERRED EMBODIMENTS

The waste water treatment plant 10, described with reference to FIGS. 1 to 4, comprises a rectangular steel tank 11 mounted on a pair of steel beams 12. The tank 11 is subdivided by wall 13 into two separate tanks, a reaction tank 14 of ⅓ the volume of tank 11 and an aeration tank 15 of ⅔ the volume of tank 11. The reaction tank 14 is, in turn, subdivided into a pre-react zone 16 and a react zone 17 by a baffle 18. An aperture is created between the lower edge of baffle 18 and the floor of tank 11 allowing communication between the pre-react zone 16 and the react zone 17.

An inlet pipe 19 admits waste water continuously, or discontinuously, into the pre-react zone 16 of the reaction tank 14. The pre-react zone 16 also contains three float switches 21, 22 and 23 each at a different level within the pre-react zone 16. The function of these float switches 21, 22 and 23 will be hereinafter described.

An air lift pump 24 is positioned within the react zone 17 of the reaction tank 14 to transfer waste water to the aeration tank 15. The air lift pump 24 comprises a U-tube 25 having a long arm 26 extending downwardly approximately half way into the reaction tank 14 and a short arm 27 extending into a distribution box 28 mounted on the wall 13 above the upper water level in the aeration tank 15. An air line 29 controlled by solenoid valve 31 admits air to the lower end of long arm 26 to actuate the pump.

The short arm 27 of the air lift pump 24 discharges into a well 32 in the floor of the distribution box 28. A pair of distribution pipes 33 are operatively connected with the floor of the distribution box 28. The pipes 33 descend vertically from the distribution box 28 parallel to and adjacent to the wall 13 and then extend horizontally substantially the full length of the aeration zone 15 just above the floor of the tank 11. Each of the distribution pipes 33 is formed with apertures 34 spaced apart along its length to ensure even, low velocity, distribution of the waste water into the aeration tank 15.

The distribution box 28 is formed along its side adjacent the reaction tank 14 with a weir 35 such that if the tank 28 overflowed the overflow would flow back into reaction tank 14. The wall 13 is formed with a pair of spillways 36, one on each side of distribution tank 28, such that any overflow from reaction tank 14 will flow into aeration tank 15.

A process air pipe 36 carries aeration air to three aeration nozzles 37 via air distribution pipes 38. Two of the aeration nozzles 37 are disposed proximally to the bottom of the tank 11, and adjacent the wall 13 in the aeration tank while the third nozzle 37 is similarly placed in the reaction tank 14.

A second air lift pump 39 is positioned in aeration tank 15 and adapted to return waste water and sludge from the aeration tank 15 to the pre-react zone 16 of the reaction tank 14. The air lift pump 39 comprises a U-tube having a long arm 41 extending some two thirds of the way down the aeration tank 15 and a short arm 42 discharging into the head space of the pre-react zone 16. An air line 43, controlled by solenoid valve 44, introduces air into the lower end of the long arm 41 of the air lift pump 39.

The outlet from the aeration tank 15 comprises a weir 45 forming an edge to a launder 46 which communicates with a drain pipe 47.

In operation, and assuming the plant has been in previous operation, the waste water for treatment will flow into the pre-react zone 16 through the inlet pipe 19 until the uppermost level switch 21 is actuated. This switch 21 serves to switch on the solenoid valve 31 admitting air to the air lift pump 24. The waste water from the reaction tank 14 is thus pumped to distribution tank 28 and thus, via distribution pipes 33 and apertures 34, into the aeration tank 15. This low pressure flow is carried out in such a way as to cause minimum agitation of the sludge in the aeration tank 15 while displacing the clarified waste water therein upwardly. When the water level in the aeration tank 15 rises sufficiently the clarified waste water flows out of aeration tank 15 over weir 45 into launder 46 and thus to drain 47.

When the waste water in the reaction tank 14 has fallen to the level of the lowermost switch 23 in the pre-react zone 16 the solenoid valve 31 is closed and the transfer of waste water to the aeration tank 15 stopped. After a time interval sufficient for waste water in the distribution box 28 to drain into the aeration tank 15 the timer means (not shown) open solenoid valve 44 and thereby actuate air lift pump 39.

The air lift pump 39 transfers waste water and sludge to the pre-react zone 16 for a predetermined time which is sufficient to reduce the water level in the aeration tank 15 sufficiently that aeration of that tank will not cause waste water and sludge to flow over weir 45. The operation of air lift pump 39 is stopped by the timer means which simultaneously actuates the pump (not shown) supplying air to the aerators 37.

The aeration continues in both the reaction tank 14 and the aeration tank 15 until the waste water entering the reaction tank 14 has raised the water level therein to the intermediate float switch 22. This switch 22 stops aeration which allows the sludge in the aeration tank 15 to settle. When the continued admission of waste water to the reaction tank 14 has raised the water level to the uppermost switch 21 air lift pump 24 is reactivated and the cycle begins afresh.

Figure 1:
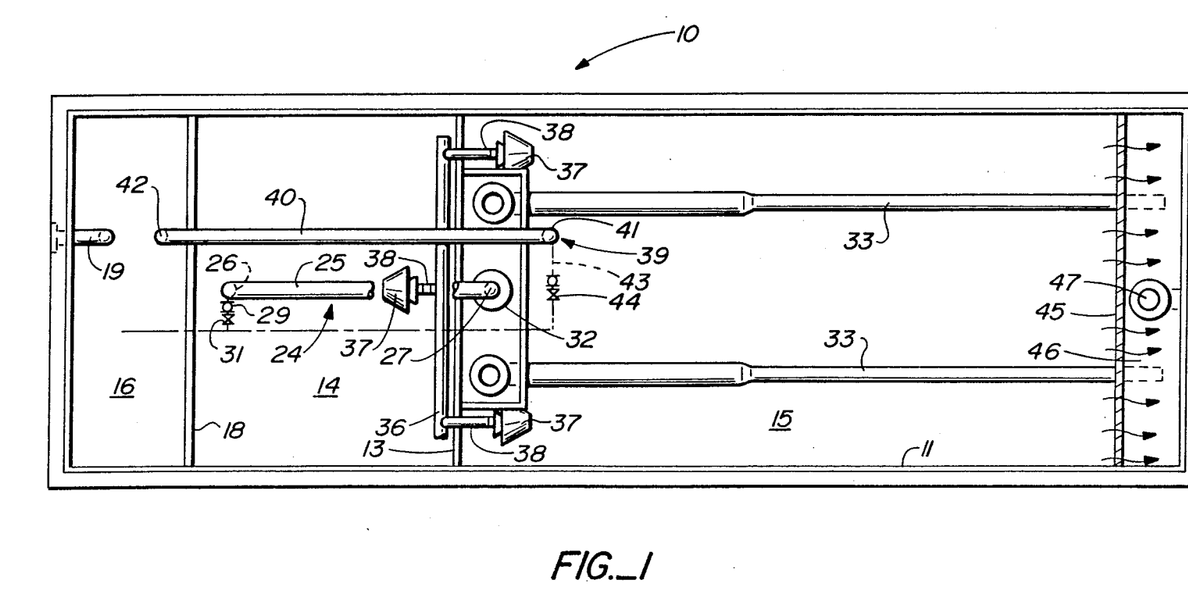
FIG. 1 is a plan view of a waste water treatment plant according to this invention.
Figure 2:
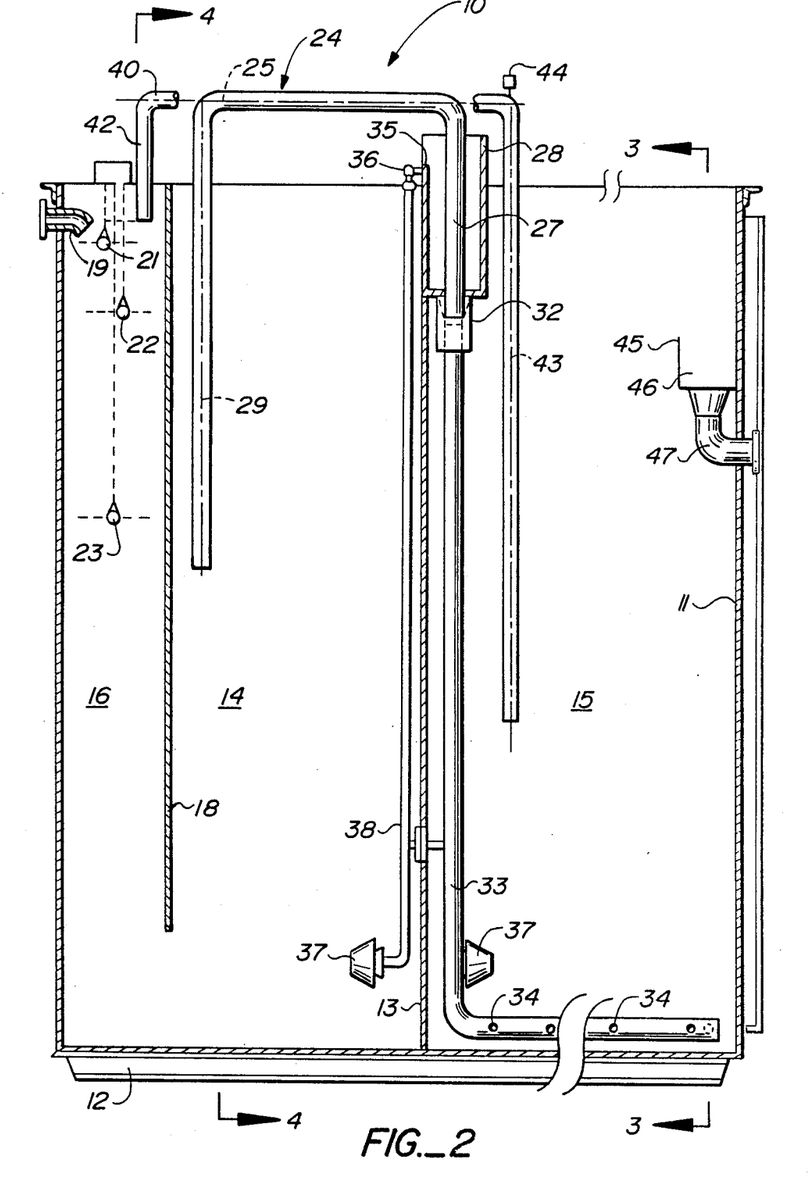
FIG. 2 is a longitudinal sectional view through the waste water treatment plant of FIG. 1.
Figure 3:
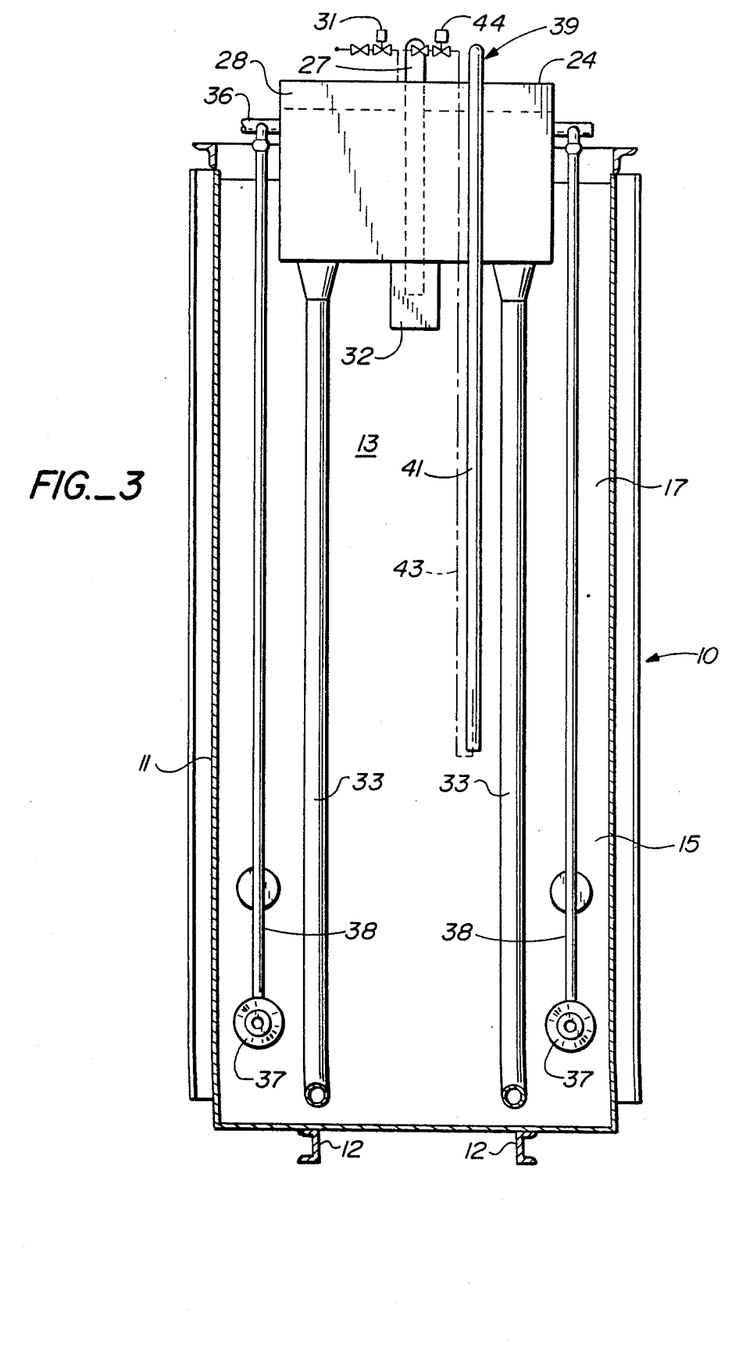
FIG. 3 is a cross transverse sectional view of the waste water treatment plant along A—A of FIG. 2.
Figure 4:
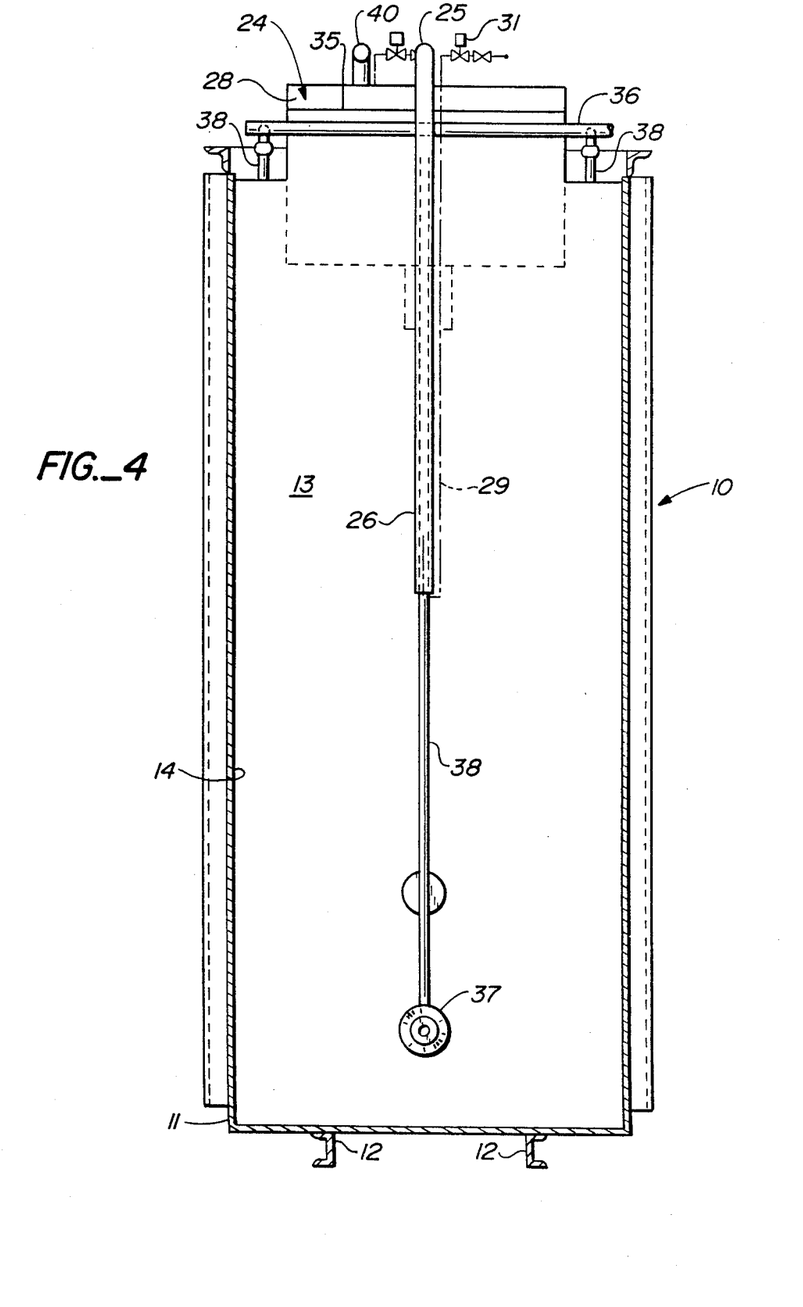
FIG. 4 is a transverse sectional view of the waste water treatment plant along B—B of FIG. 2.
Figure 5:
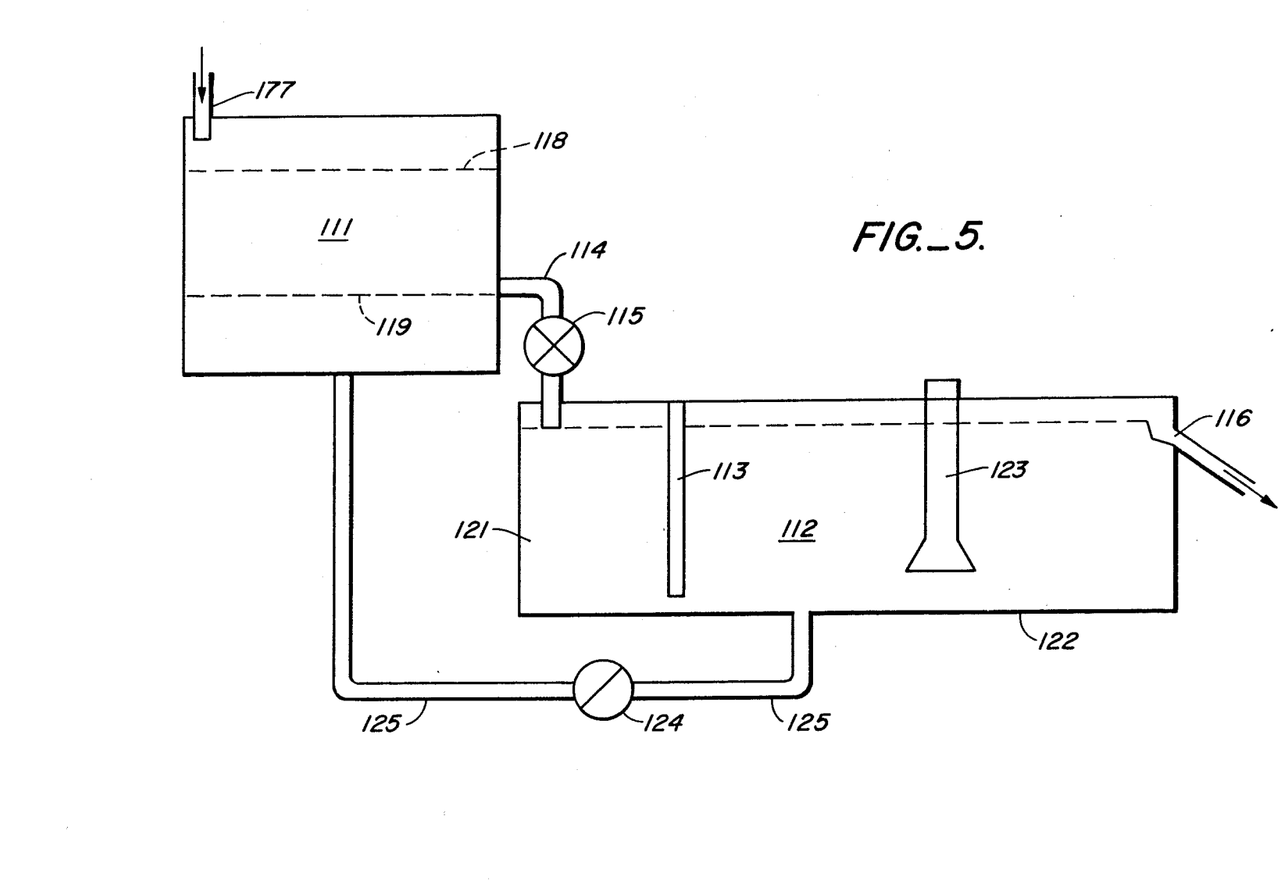
FIG. 5 is a transverse sectional view through a further embodiment of a waste water treatment plant according to this invention.

The waste water treatment system 110 described with reference to FIG. 5 comprises a reaction tank 111, an aeration tank 112 containing a baffle 113, a duct 114 between the tanks 111 and 112 having a valve 115 and an outlet wier 116.

The reaction tank 111 includes an inlet duct 117 through which untreated waste water can be introduced, continuously or intermittently, into the reaction tank 111. Waste water will be admitted to the reaction tank 111 until the level thereof rises to the predetermined level shown by dotted line 118. When the waste water reaches this level control means (not shown) will actuate valve 115 and allow waste water to flow down the duct 114 into the aeration tank 112. This flow will continue until the waste water in the reaction tank 111 reaches predetermined level 119 at which time valve 115 is closed.

The aeration tank 112 is divided by the baffle 113 into two sections. The first and smaller, section 121 into which duct 114 flows, and a large second section 122 from which the outlet wier 116 discharges. An aeration device 123 is provided to aerate the waste water in the second section 122 of the aeration tank 112.

A pump 124 is provided in duct 125 to pump sludge from the bottom of the aeration tank 112 into the reaction tank 111.

In operation waste water is admitted to the reaction tank 111 through pipe 117 substantially continuously. When the waste water has built up to level 118 the control system (not shown) stops the aeration device 123 to allow the sludge in the aeration tank 112 to settle. The valve 115 is then opened transferring waste water to the aeration tank 112. As the waste water flows into aeration tank 112 an equal volume of the waste water already contained therein will be discharged through the outlet wier 116.

At the end of each cycle and before aearation recommences the waste water level in the aeration tank 112 is lowered and settled sludge from the bottom of the aeration tank 112 is recycled to the reaction tank 111 by pump 124 through duct 125.

We claim:

1. A waste water treatment plant comprising a reaction tank and an aeration tank, the reaction tank having a bottom surface and being subdivided by at least one baffle into a pre-react zone and a react zone, the zones being in communication through at least one aperture adjacent said bottom surface of said reaction tank, inlet means for admitting waste water for treatment into the pre-react zone of the reaction tank, first transfer means for intermittently transferring waste water from the react zone of the reaction tank to the aeration tank to displace treated water therefrom through stationary outlet means, the first transfer means discharging proximate the bottom of the aeration tank, aeration means to aerate the react zone of the reaction tank and the aeration tank but not the pre-react zone of the reaction tank when the first transfer means is inoperative, second transfer means for transferring sludge and waste water from the aeration tank to the pre-react zone of the reaction tank after the first transfer means has ceased operation and before the aeration means is actuated, and control means to stop the aeration means in sufficient time before actuation of the first transfer means to allow substantial settling of the sludge in the aeration tank.

2. A waste water treatment plant as claimed in claim 1, in which the reaction tank and the aeration tank are rectangular, are formed of steel sheet, and have a common wall.

3. A waste water treatment plant as claimed in claim 1, in which the effective volume of the aeration tank is from 1.5 to 3 times the effective volume of the reaction tank.

4. A waste water treatment plant as claimed in claim 1, in which the pre-react zone comprises from 10 to 40% of the effective volume of the reaction tank.

5. A waste water treatment plant as claimed in claim 1, in which at least one of the first and second transfer means is an airlift pump.

6. A waste water treatment plant as claimed in claim 1, in which the first transfer means delivers the waste water into a launder above the aeration tank from where it can flow to a distributor disposed at the bottom of the aeration tank under gravity.

7. A waste water treatment plant as claimed in claim 1 in which the aeration tank is subdivided by a baffle into two communicating zones, a first zone into which waste water from the reaction tank is admitted and a second zone containing the aeration means.

8. A waste water treatment plant as claimed in claim 1 in which the reaction tank is positioned at a higher level than the aeration tank and the first transfer means comprises a valved pipe extending between those tanks.

9. A process for the digestion of the organic content of waste water comprising cyclically following the steps of:
  admitting the waste water to a pre-react zone of a reaction tank which is separated from a react zone thereof by at least one baffle, the zones communicating through at least one aperture in the baffle adjacent to a bottom surface of said reaction tank;
  intermittently transferring at least a part of the waste water from the react zone of the reaction tank to an aeration tank to displace treated water therefrom the waste water transferred being admitted to the reaction tank proximate the bottom thereof;
  transferring some waste water and sludge from the aeration tank to the pre-react zone of the reaction tank after transfer of the waste water from the react zone of the reaction tank to aeration tank has ceased;
  aerating the react zone of the reaction tank and the aeration tank, but not the pre-react zone of the reaction tank, after the waste water and sludge have been transferred from the aeration tank to the pre-act zone of the reaction tank; and
  stopping the aeration sufficiently before the next transfer of waste water from the react zone of the reaction tank to the aeration tank to allow substantial settling of the sludge in the aeration tank.

10. The process described in claim 9, wherein said transferring of the waste water from the react zone to the aeration tank comprises discharging the water close to the bottom of the aeration tank.

11. The process described in claim 10, wherein said transferring of water from the reaction tank to pre-react zone comprises withdrawing the water from approximately two-thirds down into the aeration tank and discharging it into the head space of the pre-react zone.

12. A waste water treatment system comprising:
  a first tank comprising a pre-react zone and including inlet means for admitting waste water to the system for treatment,
  a second tank comprising a react zone and including a first aerator means,
  a third tank having an aeration zone and a second aerator means, said first tank having no aerator, and
  said first tank having a connection adjacent to its bottom, with said second tank adjacent to its bottom, for fluid flow therebetween,
  first transfer means for intermittently transferring waste water from the react zone to the aeration zone for displacing treated water therefrom through stationary outlet means of said transfer,
  means for actuating said first and second aerator means for aerating the react zone and the aeration tank but not the pre-react zone when the first transfer means is inoperative,
  second transfer means for transferring sludge and water from the aeration tank to the pre-react zone after the first transfer means has ceased operation and before the aerator means are actuated, and
  control means for stopping the aerator means in sufficient time before actuation of the first transfer to allow substantial settling of the sludge in the aeration tank.

13. The system described in claim 12, wherein said first transfer means includes an inlet located in the react zone and an outlet located at the bottom of the aeration tank and arranged for discharging wastewater over the bottom of the aeration tank at low velocity.

14. The system described in claim 13, wherein said inlet of the second transfer means is located at approximately two-thirds of the depth of the aeration tank.

15. A wastewater treatment plant comprising:
  a reaction tank;
  an aeration tank having first and second zones in liquid-flow communication with one another, the reaction tank and the aeration tank being in communication via at least one aperture adjacent the bottom of the reaction tank;
  inlet means for admitting wastewater for treatment into the reaction tank;
  stationary outlet means for discharging overflow effluent from the aeration tank;
  first transfer means for transferring wastewater from the reaction tank to the aeration tank;
  second transfer means for transferring sludge from the aeration tank to the reaction tank via the at least one aperture adjacent the bottom of the reaction tank;
  aeration means to aerate the first and second zones of the aeration tank, but not the reaction tank; and
  control means to control operation of the aeration means and transfer means to provide cyclic operation comprising the steps of: stopping the aeration means and allowing substantial settling of the sludge in the aeration tank
  transferring wastewater from the reaction tank to the aeration tank by said first transfer means while discharging overflow effluent from the aeration tank; transferring sludge from the aeration tank to the reaction tank by said second transfer means; and restarting the aeration means.

16. A wastewater treatment plant according to claim 15, including a partition means that partitions the first and second zones of the aeration tank from one another while allowing underflow from the first zone to the second zone.

17. A wastewater treatment plant according to claim 16 wherein the partition means is a baffle that subdivides the aeration tank into the first and second zones.

18. A wastewater treatment plant according to claim 17, wherein the first zone is for receiving wastewater from the reaction tank, and the second zone contains the aeration means.

19. A wastewater treatment plant according to claim 15, wherein the effective volume of the aeration tank is from 1.5 to 3 times the effective volume of the reaction tank.

20. A wastewater treatment plant according to claim 15, wherein at least one of the first and second transfer means is an airlift pump.

21. A wastewater treatment plant according to claim 15 wherein the reaction tank is positioned at a higher level than the aeration tank, and the first transfer means comprises a valved pipe extending between those two tanks.

* * * * *